United States Patent Office 2,728,650
Patented Dec. 27, 1955

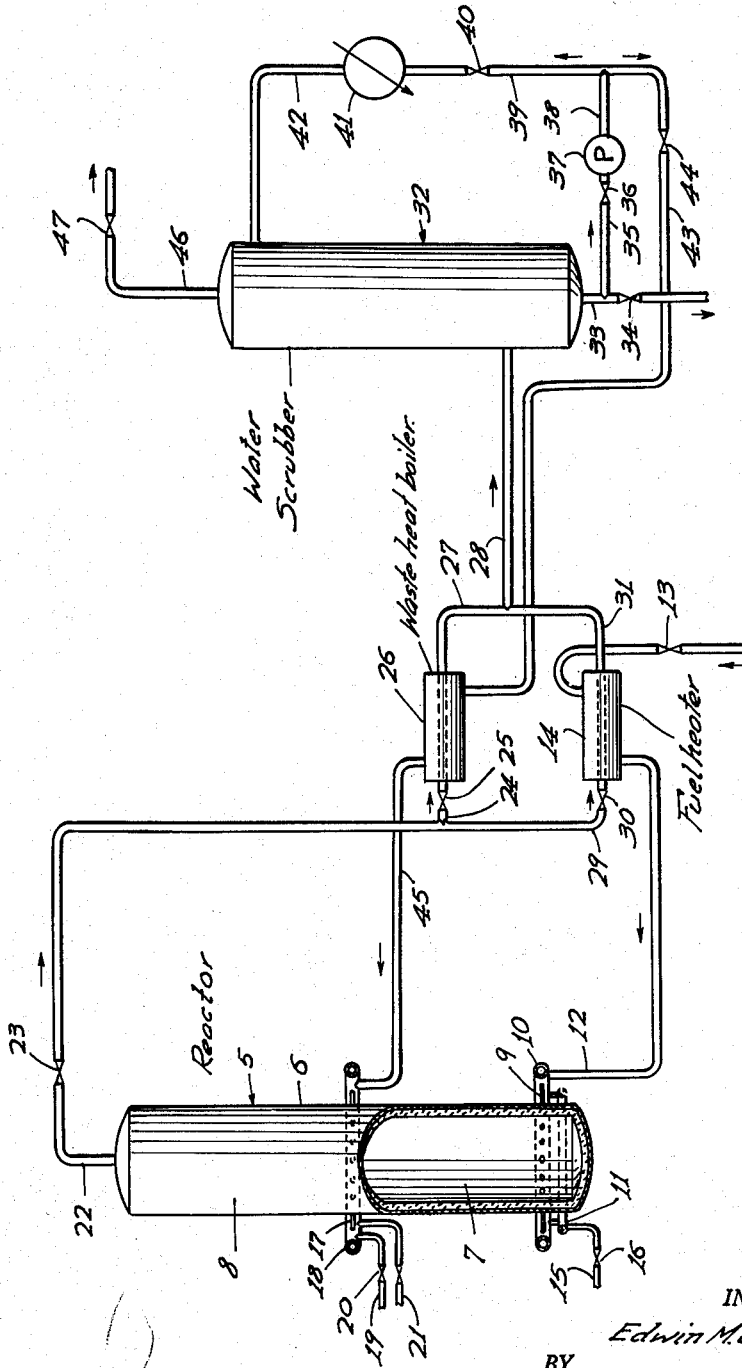

2,728,650

PROCESS FOR PRODUCING GAS COMPRISING HYDROGEN

Edwin M. Glazier, Penn Township, Allegheny County, Pa., assignor to Gulf Research & Development Company, Pittsburgh, Pa., a corporation of Delaware Application November 9, 1951, Serial No. 255,669

5 Claims. (Cl. 48—196)

This invention relates to the production of a gas comprising hydrogen and more particularly it relates to the production of a gas comprising hydrogen and carbon monoxide and consisting of a major proportion of hydrogen and a minor proportion of carbon monoxide from hydrocarbons, oxygen, and steam.

A gas comprising a major proportion of hydrogen and a minor proportion of carbon monoxide, such as a mixture containing hydrogen and carbon monoxide in a mol ratio of about 10 to 1, is desirable because it can be employed in synthesizing hydrocarbons by the Fischer-Tropsch process, as raw material for the production of pure hydrogen, and for other uses.

In the past it has been proposed to produce synthesis gas from hydrocarbons and steam by processes which are cyclic in nature or which comprise producing a raw synthesis gas with a low hydrogen to carbon monoxide mol ratio at an elevated reaction temperature above about 1700° F., passing the raw synthesis gas through indirect heat exchangers designed to give substantially instantaneous cooling to about 900° F. and to prevent the formation of carbon, and then subjecting the raw synthesis gas to the water gas shift reaction at about 900° F. by passing the synthesis gas through a bed of iron oxide or other water gas shift reaction catalyst.

I have found that a mixture of hydrogen and carbon monoxide having a high mol ratio of hydrogen to carbon monoxide can be produced in a process which does not require rapid cooling by reacting a hydrocarbon vapor and an oxygen-containing gas in an initially catalyst-free reaction zone at an elevated reaction temperature above about 1800° F., allowing the resulting ray synthesis gas comprising hydrogen and carbon monoxide with a low hydrogen to carbon monoxide mol ratio to come to substantial thermodynamic equilibrium at the elevated reaction temperature, cooling the resulting raw synthesis gas to a temperature at which carbon forms, further cooling the mixture of raw synthesis gas and carbon to a temperature of about 110° to about 1200° F., reacting added steam with the mixture of gas and carbon at a temperature of about 1100° to 1200° F. to produce hydrogen and carbon dioxide, and cooling the product gas. As will be pointed out more in detail hereinafter, carbon can be separated from the cooled product and recycled to the mixture of gas and carbon at a temperature of about 1100° to 1200° F. Under the conditions described, the carbon formed in the process and the recycled carbon, if any, act as a catalyst for the reaction between steam and carbon monoxide to form hydrogen and carbon dioxide. The product gas is comprised chiefly of hydrogen and smaller amounts of carbon monoxide, carbon dioxide and carbon. The product gas can be used as such or carbon dioxide and carbon can be removed, leaving a final product gas consisting predominantly of hydrogen. If desired, the carbon can be recycled.

In carrying out the process of my invention, it is advantageous to employ a superatmospheric pressure such as a pressure in the range of about 150 to about 600 pounds per square inch gauge and preferably about 300 pounds per square inch gauge. When a pressure of about 300 pounds per square inch gauge is employed, the product gas comprising chiefly hydrogen can be employed without any additional compression for reactions where hydrogen is necessary under such a pressure. Even for reactions which are carried out at very elevated pressures there is a considerable process saving in producing product gas at a pressure such as 300 pounds per square inch gauge and then further compressing the product gas to the desired pressure rather than producing the gas at atmospheric pressure and compressing it to the desired elevated pressure.

The hydrocarbon vapors employed with the oxygen-containing gas as charge mixture can be methane, ethane, natural gas or the like. Natural gas usually comprises a major proportion of methane, and minor proportions of ethane, propane, butane, and nitrogen. For simplicity of description, the hydrocarbon vapors will hereafter be referred to as methane. The oxygen-containing gas which is employed can be air, oxygen-enriched air, or substantially pure oxygen. When a product gas is desired in which the presence of nitrogen is not deleterious, air or oxygen-enriched air is employed, but when, as is usually the case, a product gas is desired which contains no more than a small proportion of nitrogen, substantially pure oxygen is employed as the oxygen-containing gas.

As has been pointed out previously, the elevated reaction temperature should be in excess of 1800° F. Methane and oxygen, when charged in proportions selected to provide the ratio of carbon, hydrogen and oxygen necessary to produce raw synthesis gas at a temperature above 1800° F., react at a rapid rate. As the temperature is increased beyond 1800° F. the reaction rate of the desired reactions is increased, but the amount of carbon dioxide produced and the amount of oxygen which is necessary to more completely burn the methane to obtain the higher temperature, are also increased. Because of this, preferred results are obtained with a reaction temperature in the range of about 2000° to 2200° F. When a reaction temperature in excess of 1800° F. and preferably in the range of 2000° to 2200° F. is employed, not only is the reaction rate sufficiently rapid but also the formation of a substantial amount of carbon in the initial reaction zone is prevented.

After the methane and oxygen react at the elevated reaction temperature, the hot gaseous mixture is permitted to come to substantial thermodynamic equilibrium to yield a raw synthesis gas containing hydrogen and carbon monoxide in a mol ratio of about 1.5:1 to 2:1.

The raw synthesis gas is then cooled to a temperature at which carbon is formed. The highest temperature at which carbon is formed depends upon the composition of the charge mixture introduced into the reaction zone and the reaction pressure employed in this zone. Carbon is first formed at a higher temperature as the oxygen to methane ratio of the charge mixture is decreased and as the pressure is increased. For example, at a pressure of 10 atmospheres, carbon is formed at temperatures below 1441° F. (1056° K.) with a feed mixture containing oxygen and methane in a mol ratio of 0.65:1, and at a temperature below 1576° F. (1131° K.) with a fuel mixture containing oxygen and methane in a mol ratio of 0.55:1. At a pressure of 20 atmospheres, carbon is formed below 1494° F. (1085° K.) with a feed mixture having an oxygen to methane ratio of 0.65:1, and at temperatures below 1625° F. (1158° K.) for a feed mixture having an oxygen to methane ratio of 0.55:1. The rate of formation of carbon decreases as the mixture of gases is cooled and becomes practically negligible below about 1400° F.

The amount of carbon formed as the raw synthesis gas is cooled from an elevated reaction temperature to a temperature of about 1100° to 1200° F. depends upon the rate of cooling employed as the gas is cooled from the highest temperature at which carbon is formed under the process conditions to a temperature at which the rate of carbon formation becomes practically negligible, that is, at about 1400° F.

As the raw synthesis gas is cooled or when the raw synthesis gas has been cooled to about 1100° to 1200° F., steam is introduced. The carbon formed by the reduction in temperature acts as a catalyst for the water gas shift reaction: $CO + H_2O \rightarrow CO_2 + H_2$.

The raw synthesis gas can be cooled from the reaction temperature to a temperature of about 1100° to 1200° F. or a little higher by any desired cooling means; however, the rate of cooling through the range of temperatures at which carbon is formed must be sufficiently low that at least a substantial amount of carbon is produced. It is preferred to effect this cooling by adding steam or water to raw synthesis gas at the reaction temperature. When steam is thus employed to cool the raw synthesis gas, the large amount of steam required causes a mass action effect which moves the equilibrium of the water gas shift reaction shown above to the right and correspondingly increases the hydrogen-carbon monoxide mol ratio of the final product gas.

The water gas shift reaction is allowed to come to substantial thermodynamic equilibrium at a temperature of about 1100° F. to 1200° F., thus producing a product gas comprising chiefly hydrogen. The product gas, for example, may comprise hydrogen and carbon monoxide in a mol ratio of 10:1.

The product gas is then removed from the water gas shift reaction zone and is cooled. The final product gas at a pressure of about 300 pounds per square inch is then passed to a countercurrent water scrubber in which carbon is removed mechanically. The carbon is discharged as waste or a portion or all of the carbon is recycled to be employed as a catalyst for the water gas shift reaction in the manner previously described.

I have found that for commercial operations in which a product gas comprised chiefly of hydrogen is continuously produced, preferred results are obtained when a portion of the carbon removed from the scrubber is recycled. By operating in this manner, the concentration of carbon can be adjusted with changes in the operating conditions. For example, as will be brought out hereinafter in describing a preferred embodiment of my invention, when a process is operated under conditions such that about 0.0004 pound of carbon per cubic foot of reactive gases is produced, the carbon concentration can be increased to obtain a preferred carbon concentration of about 0.0025 pound per cubic foot by recycling carbon from the scrubber.

The final product gas comprising hydrogen, carbon monoxide, and carbon dioxide and substantially free of carbon can then be treated by known methods, as for example, by scrubbing with monoethanolamine to remove carbon dioxide, leaving hydrogen and carbon monoxide to be employed in synthesis reactions as such, or it can be further processed to remove the remaining carbon monoxide and produce commercially pure hydrogen.

By operating in this manner, a synthesis gas containing a substantial proportion of hydrogen is produced in a continuous manner in a reaction zone which is initially substantially free of catalyst.

In order that the invention can be understood more fully, a preferred embodiment will now be described in connection with the accompanying drawing which is hereby made a part of this specification. The single figure is a simplified flow sheet in which various apparatus units are illustrated more or less diagrammatically.

Referring to the figure, reaction vessel 5 comprises an exterior pressure tight steel insulated shell 6, a lower elongated insulated reaction zone 7 and an upper elongated insulated water gas shift reaction zone 8.

Approximately radial primary nozzles 9 are located at intervals around the periphery of reaction vessel 5 and are directed radially as shown or at a small angle off center. Primary nozzles 9 are supplied by fuel manifold 10 and oxygen-containing gas manifold 11. Fuel is supplied to fuel manifold 10 by line 12 containing valve 13 and fuel heater 14. The fuel is preheated in fuel heater 14 by heat exchange with a portion of the products discharged from reactor 5 in a manner which will be described hereinafter. Oxygen-containing gas manifold 11 is supplied by line 15 containing valve 16. Approximately radial secondary nozzles 17 are located at the bottom of elongated water gas shift reaction zone 8 at intervals around the periphery of the reaction vessel and are directed radially as shown or at a small angle off center opposite the off center angle of primary nozzles 9. Secondary nozzles 17 are supplied with steam by manifold 18 which in turn is supplied with steam by line 19 containing valve 20 and with water by valved line 21.

Reaction products are passed from the top of the water gas reaction zone 8 by line 22 containing valve 23. A portion of the reaction products in line 22 is passed by line 24 containing valve 25 into waste heat boiler 26. After cooling, the portion of reaction products is passed from waste heat boiler 26 by line 27 into line 28. The remaining portion of the reaction products in line 22 is passed by line 29 containing valve 30 through fuel heater 14. In fuel heater 14 fuel introduced as described above is heated and the reaction products are cooled. The cooled portion of the reaction products is then passed from fuel heater 14 by line 31 into line 28.

The mixture of cooled reaction products is then passed by line 28 into water scrubber 32. Water containing suspended carbon is removed from scrubber 32 by line 33 containing valve 34 and a portion of the water and suspended carbon is discharged as waste. Another portion of the water containing suspended carbon is passed from line 33 by line 35 containing valve 36 to circulation pump 37. Recirculated water containing carbon is removed from circulating pump 37 by line 38 and a portion is passed by line 39 containing valve 40 into cooler 41 wherein it is cooled. After cooling, this portion of the recirculated water containing carbon is passed by line 42 into the top of water scrubber 32. The remaining portion of the recirculated water not passed to cooler 41 is passed from line 38 through line 43 containing valve 44 into waste heat boiler 26 and is heated therein by a portion of the reaction products from water gas reaction zone 8 as was described previously. The heated recirculated water containing suspended carbon is passed from waste heat boiler 26 by line 45 to manifold 18 and then by secondary nozzles 17 into the bottom of the water gas shift reaction zone 8. Product gas is removed from water scrubber 32 by line 46 containing valve 47 and is discharged at the reaction pressure. As was pointed out previously, the carbon dioxide contained in the product gas can be removed by scrubbing with monoethanolamine or by other ways in scrubbers which are not shown.

A preferred embodiment of the process of the invention for producing a synthesis gas comprising a major proportion of hydrogen is carried out in the apparatus described in the drawing in the following manner. A mixture of hydrocarbons and oxygen is employed as a charge mixture. The proportions of hydrocarbons and oxygen in the mixture are adjusted, depending upon the specific composition of fuel employed so as to produce under conditions of the process an elevated reaction temperature of about 2000° to 2200° F. In general, as was pointed out previously, the fuel is preferably natural gas which comprises a major proportion of methane, a minor proportion of higher molecular weight hydrocarbons, and no more than 10 per cent nitrogen. The oxygen should preferably contain no more than 5 per cent nitrogen. The oxygen is introduced to nozzles 11 at a temperature of from 100° to 600° F. and the natural gas is introduced at a temperature of from 100° to 1200° F. The linear velocity of the fuel mixture in the nozzles must be above the flame velocity of the reaction pressure mixture to prevent flash backs into the nozzles. Reaction pressure is about 150 to 600 pounds per square inch, preferably about 300 pounds per square inch.

In the reaction zone 7, natural gas reacts with the oxygen. Raw synthesis gas comprising carbon monoxide, hydrogen, carbon dioxide and water is formed and a substantial amount of heat is evolved which maintains the reaction temperature and heats the heat retentive walls. The mixture of the products first formed in the reaction zone moves up the combustion tube and reaches thermodynamic equilibrium at a reaction temperature of about 2100° F.

Dry, saturated, or wet steam or water at the reaction pressure is introduced by means of nozzles 17 into the bottom of the elongated water gas shift reaction zone 8. If desired, additional carbon suspended in water is recycled from the scrubber. Steam or water cools the raw synthesis gas, additional carbon is formed, and the carbon catalyzes the reaction of steam with carbon monoxide. The mixture of raw synthesis gas, carbon, and reaction products thereof is allowed to come to substantial thermodynamic equilibrium at a temperature of about 1100° to 1200° F. in the water gas shift reaction zone.

Product gas is removed from water gas reaction zone 8 at a temperature of about 1100° to 1200° F. and is cooled in fuel heater 14 and waste heat boiler 26 to about 400° F. The product gas is then scrubbed of carbon and cooled to about 150° F. in the scrubber. All or part of the carbon can be recycled to the water gas shift reaction zone. Scrubbed, carbon-free product gas is removed and discharged by line 46.

The following is an example of a specific embodiment of the process. Natural gas with the composition of $C_{1.07}H_{4.14}$, an average molecular weight of 17.14 and having the following composition is employed as fuel: Methane 95 per cent, ethane 3.5 per cent, propane 1 per cent, butane 0.5 per cent, and nitrogen 0.0 per cent. The natural gas is obtained at a pressure of 375 pounds per square inch and at a temperature of 100° F.

37,000 M. S. C. F./S. D. (1000 standard cubic feet per stream day) of natural gas are heated in natural gas heater to a temperature of about 480° F. and are metered to the primary nozzles 9. 23,400 M. S. C. F./S. D. of oxygen containing about 5 per cent nitrogen are supplied to the primary nozzles 9 at a pressure of 375 pounds per square inch and a temperature of 415° F. The mol ratio of natural gas to oxygen is 1.58:1. On entering the primary nozzles 9 of the reaction zone, the natural gas is mixed with oxygen and is discharged into the reaction zone 7 which is at a temperature of about 2060° F. and a pressure of about 300 pounds per square inch. Reaction occurs producing raw synthesis gas and heat which maintains the insulated walls at the desired temperature. The mixture of products first formed in the reaction zone moves up the reaction zone at a net linear velocity along the reaction zone of about 10 feet per second allowing about two seconds for the gases produced to reach equilibrium. The ratio of hydrogen to carbon monoxide in the raw synthesis gas at this point is about 1.67:1.

1,178,400 pounds per stream day of steam are introduced by line 19 and 59,040 gallons per stream day of water are admitted by valved line 21 through manifold 18 and secondary nozzles 17 into the bottom of water gas shift reaction zone 8. 432,000 gallons per stream day of water containing 58,700 pounds per stream day of carbon are introduced at a temperature of about 425° F. by line 45 into manifold 18 and then by secondary nozzles 17 into water gas shift reaction zone 8. The water and steam cool the raw synthesis gas. 11,700 pounds per stream day of carbon are formed and this carbon and the 58,700 pounds of recycled carbon introduced with the water catalyzes the reaction of steam with carbon monoxide. The carbon concentration is about 0.0025 pound per cubic foot of reactant gases. The product gas reaches substantial thermodynamic equilibrium at 1100° F. in the elongated water gas shift reaction zone 8.

The product gas is then removed from reactor 5 by line 22. A portion of it is passed through waste heat boiler 26 wherein it is cooled to about 400° F. and the recirculated water introduced to the water gas shift reaction zone 8 is heated to about 425° F. The remaining portion of the reaction products is passed through fuel heater 14 and is cooled therein to a temperature of about 400° F. while preheating the fuel introduced to about 480° F.

The cooled reaction products are then introduced to the scrubber. 86,400 gallons per stream day of water containing 11,700 pounds of carbon per stream day are discharged as waste from scrubber 32. 720,000 gallons of water per stream day containing suspended carbon are cooled to about 100° F. and recycled through the scrubber. 432,000 gallons per day of water containing 58,700 pounds of carbon per day are recirculated to the water gas shift reaction zone in the manner described previously.

128,000 M. S. C. F./S. D. of product gas is removed from the scrubber at a temperature of 150° F. at a pressure of 280 pounds per square inch gauge. The product gas has the following composition:

| Component: | Mol per cent |
|---|---|
| Hydrogen | 68.9 |
| Carbon monoxide | 7.6 |
| Carbon dioxide | 20.6 |
| Water | 1.3 |
| Methane | 0.7 |
| Nitrogen | 0.9 |

The process of my invention can be varied in a number of ways. For example, as was pointed out previously, the process can be operated without recycling carbon. Other reaction pressures, but preferably superatmospheric pressures in the range of 150 to 600 pounds per square inch, can be employed. Other hydrocarbon vapors such as methane, ethane or the like may be used instead of natural gas. Air or oxygen-enriched air can be employed instead of oxygen. Raw synthesis gas can be produced at any temperature in excess of 1800° F. and can be cooled by means other than the injection of steam although preferred results are obtained by this method of operation. Where other methods of cooling are used, it is nevertheless necessary to add steam in order to carry out the water gas shift reaction.

Obviously many modifications and variations of the invention as hereinbefore set forth may be made without departing from the spirit and scope thereof and, therefore, only such limitations should be imposed as are indicated in the appended claims.

I claim:

1. A process for producing a gas comprising hydrogen and carbon monoxide and consisting predominantly of hydrogen which comprises partially burning hydrocarbon vapors with an oxygen-containing gas in an initially catalyst-free reaction zone at a temperature above 1800° F. to produce a raw synthesis gas consisting essentially of hydrogen and carbon monoxide, cooling the raw synthesis gas to a temperature of about 1100° to about 1200° F. under conditions such that carbon is formed from the components of said raw synthesis gas, and reacting steam with said cooled raw synthesis gas at a temperature of about 1100° to about 1200° F. in the presence of said formed carbon to convert carbon monoxide to carbon dioxide and form additional hydrogen.

2. A process for producing a gas comprising hydrogen and carbon monoxide and consisting predominantly of hydrogen which comprises reacting natural gas with oxygen in an initially catalyst-free reaction zone at a temperature above 1800° F. and at a super-atmospheric pressure in the range of 150 to 600 pounds per square inch to produce a raw synthesis gas comprising hydrogen and carbon monoxide, adding steam to said raw synthesis gas to cool said raw synthesis gas to a temperature of about 1100° F. to 1200° F. to form carbon from the components of said raw synthesis gas, reacting steam with said raw synthesis gas at a temperature of about 1100° to 1200° F. in the presence of said carbon to convert carbon monoxide to carbon dioxide and form additional hydrogen.

3. A process for producing a gas comprising hydrogen and carbon monoxide and consisting predominantly of hydrogen which comprises partially burning hydrocarbon vapors with an oxygen-containing gas in an initially catalyst-free reaction zone at a temperature above 1800° F. to produce a raw synthesis gas consisting essentially of hydrogen and carbon monoxide, cooling the raw synthesis gas to a temperature of about 1100° to about 1200° F. under conditions such that carbon is formed from the components of said raw synthesis gas, adding additional carbon recycled in the manner described below to said cooled raw synthesis gas, reacting steam with said cooled raw synthesis gas at a temperature of about 1100° to about 1200° F. in the presence of said formed carbon and said recycled carbon to convert carbon monoxide to carbon dioxide and form additional hydrogen, cooling the resulting gas, removing said formed and said recycled carbon from the resulting cooled gas, and recycling carbon for admixture with said cooled raw synthesis gas at a temperature of about 1100° to 1200° F.

4. A process for producing a gas comprising hydrogen and carbon monoxide and consisting predominantly of hydrogen which comprises partially burning hydrocarbon vapors with an oxygen-containing gas in an initially catalyst-free reaction zone at a temperature above 1800° F. and at a superatmospheric pressure in the range of 150 to 600 pounds per square inch to produce a raw synthesis gas consisting essentially of hydrogen and carbon monoxide, adding steam to said raw synthesis to cool said raw synthesis gas to a temperature of about 1100° to about 1200° F. to form carbon from the components of said raw synthesis gas, adding additional carbon recycled in the manner described below to said cooled raw synthesis gas and reacting steam with said cooled raw synthesis gas at a temperature of about 1100° to about 1200° F. in the presence of said formed carbon and said added recycled carbon to convert carbon monoxide to carbon dioxide and form additional hydrogen, cooling the resulting gas, removing said formed and said recycled carbon from the resulting cooled gas and recycling carbon for admixture with said cooled raw synthesis gas at a temperature of about 1100° to 1200° F.

5. A process for producing a gas comprising hydrogen and carbon monoxide and consisting predominantly of hydrogen which comprises reacting methane and oxygen at a temperature of about 2000° to 2200° F. and a pressure of about 300 pounds per square inch in an initially catalyst-free elongated reaction zone to produce a raw synthesis gas consisting essentially of hydrogen and carbon monoxide, adding steam to said raw synthesis gas to cool said raw synthesis gas to a temperature of about 1100° to about 1200° F. to form carbon from the components of said raw synthesis gas, adding additional carbon recycled in the manner described below to said cooled raw synthesis gas and reacting steam with said cooled raw synthesis gas at a temperature of about 1100° to about 1200° F. in the presence of said formed carbon and said added recycled carbon to convert carbon monoxide to carbon dioxide and form additional hydrogen, cooling the resulting gas, removing said formed and said recycled carbon from the resulting cooled gas, and recycling carbon for admixture with said cooled raw synthesis gas at a temperature of about 1100° to 1200° F.

References Cited in the file of this patent

UNITED STATES PATENTS

| | | |
|---|---|---|
| 1,990,697 | Keeling | Feb. 12, 1935 |
| 2,238,576 | Heller et al. | Apr. 15, 1941 |
| 2,346,754 | Hemminger | Apr. 18, 1944 |
| 2,375,795 | Krejci | May 15, 1945 |
| 2,563,460 | Faber | Aug. 7, 1951 |
| 2,569,846 | Cornell | Oct. 2, 1951 |
| 2,591,687 | Eastman et al. | Apr. 8, 1952 |
| 2,618,543 | Mayland | Nov. 18, 1952 |